(12) United States Patent
Candiloro et al.

(10) Patent No.: US 11,892,621 B2
(45) Date of Patent: Feb. 6, 2024

(54) TRAJECTORY AND CONTROL OPTIMIZATIONS FOR REDUCED POWER

(71) Applicant: FARO Technologies, Inc., Lake Mary, FL (US)

(72) Inventors: Carl B. Candiloro, Hudson, MA (US); Arkady Savikovsky, Burlington, MA (US)

(73) Assignee: FARO Technologies, Inc., Lake Mary, FL (US)

( * ) Notice: Subject to any disclaimer, the term of this patent is extended or adjusted under 35 U.S.C. 154(b) by 774 days.

(21) Appl. No.: 17/070,041

(22) Filed: Oct. 14, 2020

(65) Prior Publication Data

US 2021/0124166 A1 Apr. 29, 2021

Related U.S. Application Data

(60) Provisional application No. 62/925,257, filed on Oct. 24, 2019.

(51) Int. Cl.
*G02B 26/10* (2006.01)
*H01S 3/00* (2006.01)

(52) U.S. Cl.
CPC .......... *G02B 26/105* (2013.01); *H01S 3/0014* (2013.01); *H01S 3/0071* (2013.01)

(58) Field of Classification Search
CPC ..................................................... H01S 3/0014
USPC ....................................................... 372/29.01
See application file for complete search history.

(56) References Cited

U.S. PATENT DOCUMENTS

| | | |
|---|---|---|
| 6,547,397 B1 | 4/2003 | Kaufman et al. |
| 6,935,748 B2 | 8/2005 | Kaufman et al. |
| 7,306,339 B2 | 12/2007 | Kaufman et al. |
| 8,582,087 B2 | 11/2013 | Kaufman et al. |
| 9,879,983 B2 | 1/2018 | Kaufman et al. |
| 10,432,903 B2 | 10/2019 | Kaufman et al. |
| 10,670,390 B2 | 6/2020 | Wilson et al. |

(Continued)

FOREIGN PATENT DOCUMENTS

| | | |
|---|---|---|
| EP | 1277066 A0 | 11/2001 |
| WO | 0182634 A2 | 11/2001 |

OTHER PUBLICATIONS

Extended European Search Report for Application No. 20200830.6 dated Mar. 22, 2021.

(Continued)

*Primary Examiner* — Tuan N Nguyen
(74) *Attorney, Agent, or Firm* — McCarter & English, LLP; Dave S. Christensen (57) ABSTRACT

Provided are embodiments for a laser projection device configured to perform trajectory optimization. The device includes a power source configured to supply power to a power amplifier; a laser projector configured to emit a laser beam towards a surface of an object; a trajectory control module configured to calculate one or more parameters for a projection trajectory of the laser beam; a beam steering unit configured to control a direction of the laser beam; and wherein the power amplifier is operably coupled to the beam steering unit, wherein the output of the power amplifier is based at least in part on the calculated one or more parameters. Also provided are embodiments for a method of operating a laser projection device configured to perform trajectory optimization.

12 Claims, 10 Drawing Sheets

(56) References Cited

U.S. PATENT DOCUMENTS

| | | |
|---|---|---|
| 10,884,257 B2 | 1/2021 | Savikovsky et al. |
| 2008/0246943 A1* | 10/2008 | Kaufman .......... G01N 21/9515 |
| | | 356/5.01 |
| 2015/0085108 A1 | 3/2015 | Kaufman et al. |
| 2019/0064324 A1 | 2/2019 | Kaufman |
| 2019/0107607 A1* | 4/2019 | Danziger .............. G01S 7/4802 |
| 2019/0115710 A1 | 4/2019 | Miller et al. |
| 2019/0368939 A1 | 12/2019 | Vakhshoori et al. |
| 2019/0391409 A1 | 12/2019 | Savikovsky et al. |
| 2021/0126419 A1 | 4/2021 | Savikovsky et al. |

OTHER PUBLICATIONS

Unknown: International Standard IEC 60825-1, Aug. 1, 2001 (Aug. 1, 2001), XP055714455, Retrieved from the Internet: URL:https://shop.textalk.se/shop/ws26/40626/files/full_size_for_start_page_banner/iec60825-1{ed1.2}en.pdf.

* cited by examiner

# TRAJECTORY AND CONTROL OPTIMIZATIONS FOR REDUCED POWER

This application claims the benefit of U.S. Patent Application Ser. No. 62/925,257 filed Oct. 24, 2019, which is incorporated herein by reference in its entirety.

BACKGROUND

Galvanometers are motors that are designed to rotate a load over a limited angular range. The load is typically an optical element. Oftentimes, a mirror for reflecting or steering a laser beam is used. The galvanometer's motor incorporates a shaft rotation sensing device that can provide feedback for a closed loop servo control of the motor position. Key parameters of galvanometer's performance include position accuracy, repeatability, and speed. Since the galvanometers are moving and changing the direction of the beam steering optic very rapidly the speed or throughput of the system is traditionally determined by torque and inertia, and hence maximum achievable acceleration.

Various systems include galvanometer based-motions systems that may have a limited power supply. These systems may be compact, remote, portable and/or handheld devices that may not necessarily have the unlimited power that is available to other non-portable systems that are connected to wall/outlet power. In addition, the laser projection provided by these systems accounts for a large portion of the power consumed by the device. By increasing the refresh rate of the laser above a perceivable threshold there will be no improved laser projection quality and more unnecessary power will be wasted. There exists a need to optimize the refresh rate of the projected pattern with the amount of power consumed by the device.

Accordingly, while existing laser projection systems are suitable for their intended purposes, what is needed is a laser projection system having certain features of embodiments described herein.

BRIEF DESCRIPTION

According to one embodiment, a laser projection device is provided. The laser projection device includes a power source configured to supply power to a power amplifier; a laser projector configured to emit a laser beam towards a surface of an object; a trajectory control module configured to calculate one or more parameters for a projection trajectory of the laser beam; a beam steering unit configured to control a direction of the laser beam; and wherein the power amplifier is operably coupled to the beam steering unit, wherein the output of the power amplifier is based at least in part on the calculated one or more parameters.

According to another embodiment, a method for performing trajectory optimization is provided. The method comprising includes supplying power to a power amplifier of a laser projection device; emitting a laser beam towards a surface of an object; calculating one or more parameters for a projection trajectory of the laser beam; and controlling the projection of the laser beam based at least in part on the calculated one or more parameters.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a laser projection system having a beam steering unit and a trajectory control module to optimize a projection of a laser used to provide a template on a surface. Embodiments of the invention provide advantages in conserving power for the laser projection system and prolonging the limited power supply by operating the system in a mode to save power.

Optical layout templating or other similar projection applications, the maximum achievable acceleration will not yield the highest efficiency for the system. Historically these systems are used in industrial environments where power consumption and efficiency are not primary concerns. The method of trajectory planning and control introduces the new capability of driving the galvanometers at a minimum rate to achieve flicker-free projection.

Conventional techniques are configured to operate at a fixed rate and are not configured to optimize the refresh rate of the projection trajectory which is repeated to generate the template.

In industrial laser projection applications, a beam steering system moves a focused laser spot over a surface of an object along a given trajectory in a repetitive manner thus creating a glowing curve line. The number of projection cycles per second is known as the refresh rate. If the beam steering speed is very low, then the glowing line appears to the human eye as a moving dot. The faster the beam steering speed the higher the refresh rate, and at higher refresh rates the glowing line begins to appear as a flickering pattern.

The glowing lines can serve as templates which are generated by the laser projectors to provide visual guidance in assembly operations which can assist an operator in the precise positioning of parts, components, and the like on any flat or curvilinear surface. Laser projection can be used in the manufacturing of composite parts, in aircraft and marine industries, or other large machinery assembly processes. Other uses can include providing a template for construction applications and temporary work sites. The laser projections allow an operator to align features of a particular part with the glowing template. After locating the appropriate position, the operator can fix the part to the corresponding object. Flickering laser projections are undesired in the production process as it can cause various symptoms for sensitive workers including fatigue, dizziness, and headaches. That is why the laser projection refresh rate has to be set so high that the glowing template will be perceived by a viewer as a steady flicker-free picture. This phenomenon is related to the persistence of vision in the same way as in viewing motion picture in cinema or on television.

The perceived steadiness of the laser projection can be achieved when the refresh rate exceeds the flicker fusion threshold. It has been determined experimentally that the typical flicker fusion threshold for the laser projection utilizing green light is about 30-35 Hz.

Increasing the refresh rate of the laser projection, in turn, increases the angular velocity and acceleration of the beam steering galvanometers thus causing an increase in the system power consumption. However, increasing the refresh rate above the threshold will not improve the performance of the laser projection because it will already be flicker-free at any refresh rate above the threshold. In addition, the visible brightness of the glowing line does not depend on the refresh rate as will be discussed below.

Therefore, to minimize the system's power consumption while preserving laser projection quality, the trajectory control method has to optimize angular acceleration and velocity for each particular trajectory to constrain the refresh rate, so it does not drop below the flicker fusion threshold.

Figure 1:
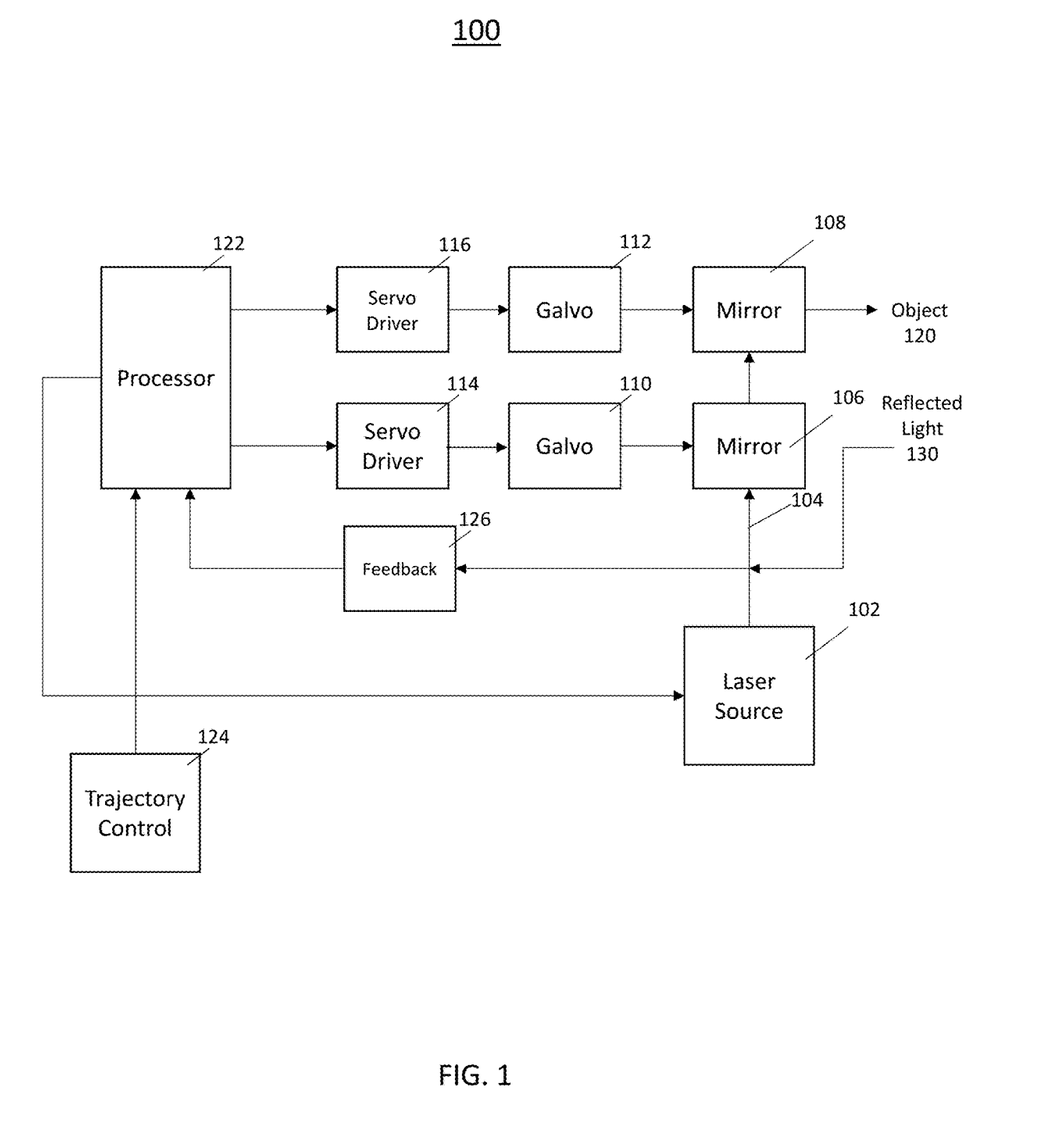
FIG. 1 depicts a system for projecting a laser along a trajectory.

FIG. 1 depicts a laser projection system 100 in accordance with one or more embodiments. In one or more embodiments of the invention, the laser source 102 produces a laser beam 104 of various wavelengths. In addition, the power of the laser beam can be output at a configurable power level. In some embodiments, a green wavelength laser beam is used.

The laser beam 104 that is projected from the laser source 102 is directed towards the surface of an object by using mirrors 106 and 108. The mirrors 106 and 108 are mounted on shafts that are coupled to the galvanometers 110 and 112 which are driven by the servo drivers 114 and 116. In one or more embodiments, the galvanometers 110 and 112 include position sensors to track the rotation position of the mirrors 106 and 108. The galvanometer 110 can be positioned to rotate a mirror 106 about a first direction and the galvanometer 112 can be positioned to rotate a mirror 108 about a different direction to steer the laser beam 104 in a configurable pattern or direction. One of the mirrors 106 and 108 can steer the laser beam 104 in the azimuth plane and the other can control the elevation of the laser beam 104. By coordinating the two mirrors 106 and 108, a laser beam 104 can be projected toward any point on the surface of an object 120.

In one or more embodiments, the laser beam 104 from the laser source 102 can be provided to a beam splitter prior to reaching the mirrors 106 and 108. In addition, various lenses can be used to manipulate the laser beam 104 such as expanding the laser beam or reducing the laser beam according to the desired application. In some embodiments of the invention, the beam may be focused on a works surface.

FIG. 1 also depicts a processor 122 which is configured to control one or more components of the laser projection system 100. The processor 122 is operably coupled to the laser source 102 and can control the operation of the laser beam 104 that is emitted from the laser source 102. In one or more embodiments, the processor 122 can be configured to generate the laser beam 104 in a continuous mode, a pulsed-mode, or another mode.

The processor 122 is also operably coupled to servo drivers 114 and 116 and the processor 122 provides commands to the servo drivers 114 and 116 that drive the galvanometers 110 and 112, respectively.

The processor 122 is also coupled to the trajectory control module 124. The trajectory control module 124 can be configured with design model CAD data which is used to generate a template on a surface of an object, such as a 3D surface. The CAD data can be in the form of x, y, z coordinates. In another embodiments, the x, y, z coordinate data can be obtained and used for projecting the laser beam 104 to provide a template on a surface of an object.

In one or more embodiments of the invention, the processor 122 is configured to convert the signals received from the trajectory control module 124 into a voltage or current signal to control the servo drivers 114 and 116 to drive the galvanometers 110 and 112, respectively. The output of the galvanometers 110 and 112 rotate the mirrors 106 and 108 to direct the laser beam 104 based on signals from the trajectory control module 124. In one or more embodiments of the invention, digital communication can be used for control of the trajectory control module 124. The trajectory of the laser beam 104 can be controlled in a repetitive manner. The laser beam 104 speed and refresh rate can be controlled to provide a visible pattern on the surface of an object.

The processor 122 is also operably coupled to a feedback system 126 which can be used to control the laser source 102 according to the feedback. The feedback system 126 can include a number of components including a photo diode to detect an optical feedback from the object (such as the reflected light 130), an amplifier, a digital-to-analog converter (DAC), an analog-to-digital converter (ADC), etc. In some embodiments, a DAC (not shown) can be coupled between the amplifier and the processor 122. The DAC can be used to control the gain of the amplifier based on feedback. For example, the feedback can include optical feedback beam reflected from the various surfaces. The output of the amplifier can be provided to an ADC and is connected to the processor 122.

Figure 2:
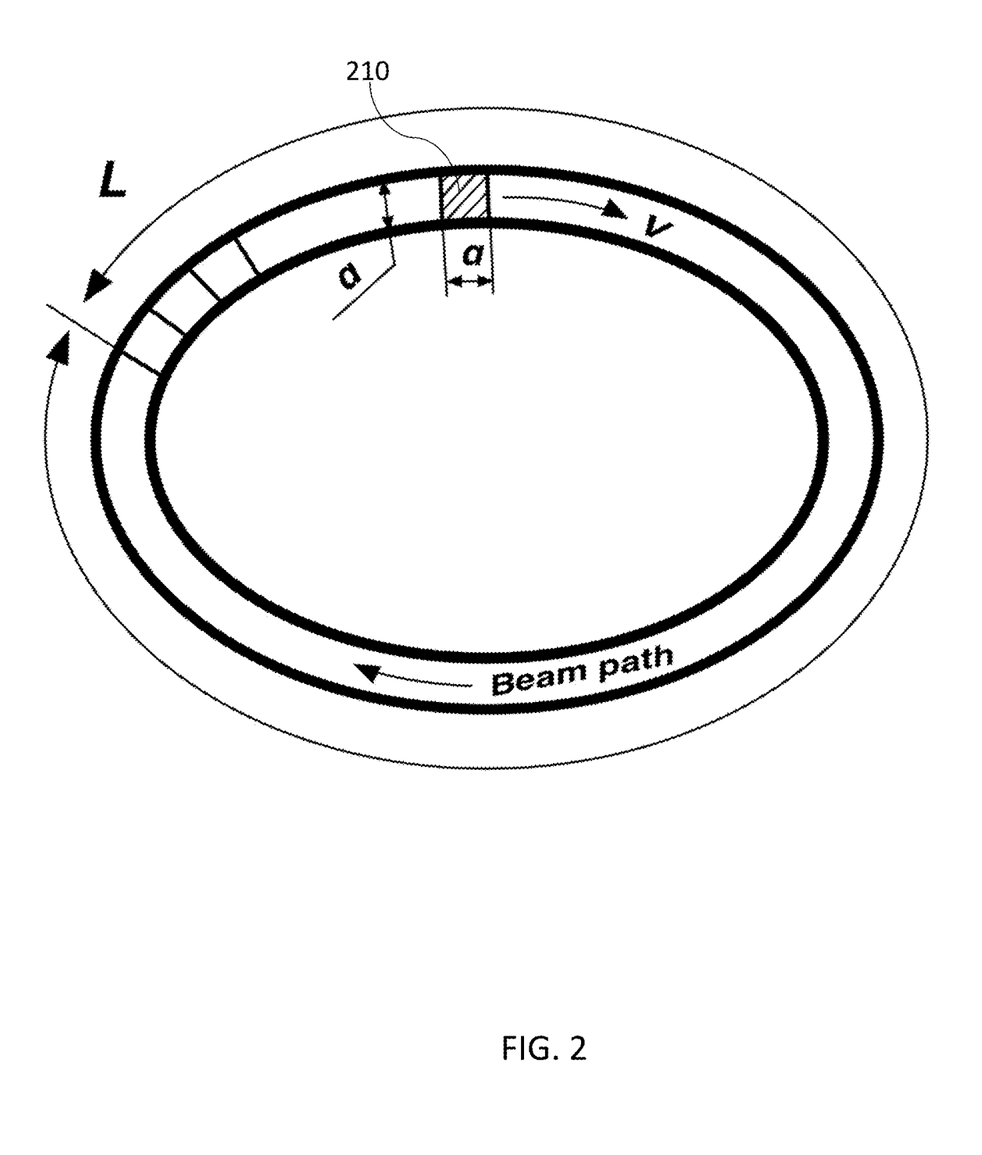
FIG. 2 depicts an example beam path from a laser projection system.

FIG. 2 depicts an example beam path of a laser beam from a laser projection system 100 that is projected on a surface. The beam path is not limited to the elliptical beam path as shown in FIG. 2. It should be understood that this is a non-limiting example which is not intended to limit the beam path projected from the device. FIG. 2 also depicts a laser spot 210 having a length a and width a. The visible brightness of the flicker-free laser projection is determined by the average luminance of the focused laser spot path as will be explained below. The laser spot 210 periodically moves with a linear velocity V along the closed trajectory path having the length L. The refresh rate is equal to 1/T, where T is a single projection period.

The incident laser beam is projected by the laser projection system 100 in a continuous wave mode. In other embodiments, the laser projection system 100 can be operated to provide a pulsed laser projection. The constant power of the laser beam is represented by $P_0$. The energy $E_0$ delivered to any area of a spot size a*a is equal to the following Equation:

$$E_0 = P_0 * t \qquad \text{(Eq. 1)}$$

where t is the time needed for the laser beam to move by a one spot size.

By substituting a/v for t, the equation for energy $E_0$ is as follows:

$$E_0 = P_0 * \frac{a}{v} \quad \text{(Eq. 2)}$$

The energy $E_T$ delivered over the beam path L during the one projection period T can be provided by the following Equation:

$$E_T = E_0 * \frac{L}{a} \quad \text{(Eq. 3)}$$

The average optical power $P_T$ illuminating the beam path L over a period T can be expressed as shown in the following Equation:

$$P_T = \frac{E_T}{T} = E_0 * \frac{L}{a*T} \quad \text{(Eq. 4)}$$

The average luminance A of the beam path that is perceived by a viewer as flicker-free projection is calculated by the average optical power $P_T$ divided by beam path area:

$$A = \frac{P_T}{L*a} = E_0 * \frac{L}{L*a^2*T} \quad \text{(Eq. 5)}$$

By substituting Equation (2) into Equation (5) and taking L=V*T, the average luminance A can be expressed by the following Equation:

$$A = \frac{P_0}{L*a} \quad \text{(Eq. 6)}$$

The expression provided above confirms that the average luminance A of the beam path glowing line does not depend on the refresh rate (period T). That is, the luminance is shown to be independent of speed.

In one or more embodiments of the invention, the trajectory control module (discussed below) is configured to set the velocity to achieve 30-35 Hz over the length L for the given trajectory pattern, which is above the flicker-fusion threshold for a green light. In addition, the trajectory control module is configured to perform the above calculations to determine the one or more parameter values to set the refresh rate of the laser projection to the desired rate. The trajectory control module 124 is configured to provide command signals that correspond to the template at the calculated refresh rate. The command signals can be to the servo drives that control the galvanometers and the rotation of the shaft coupled to a mirror that guides a laser on the surface. It should be understood different color light having different wavelengths can be used for the system.

Figure 3:
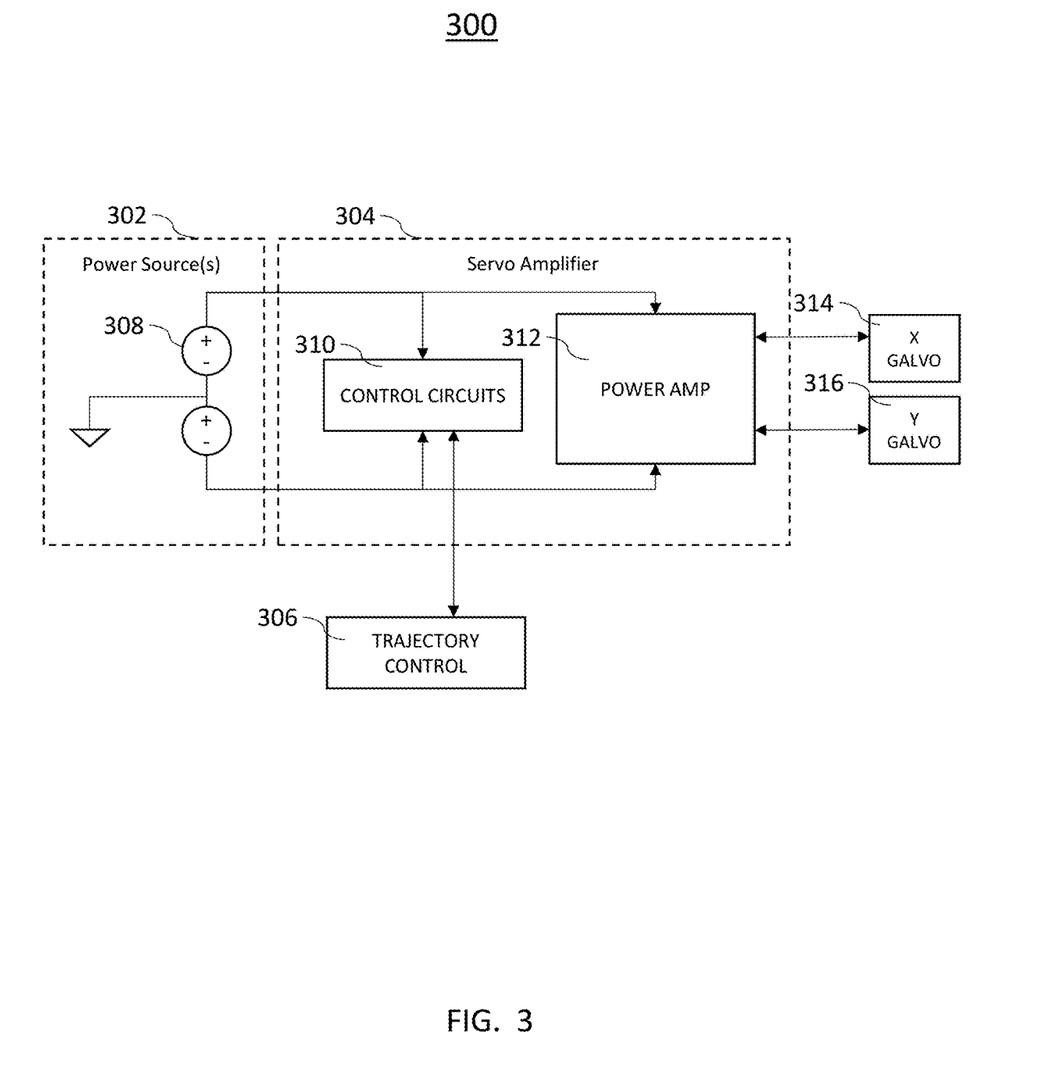
FIG. 3 depicts a system for projecting a laser beam.

Now referring to FIG. 3, a traditional system 300 for implementing trajectory control is shown and includes power sources 302 and a servo amplifier 304. The power sources 302 can include one or more DC voltage sources 308 and are coupled to the servo amplifier 304 to provide power to its components. The servo amplifier 304 includes one or more control circuits 310 and a power amplifier 304.

The trajectory control module 306 is connected to one or more control circuits 310 and provides signals to control the projection of a template or pattern by the laser projection device. As shown in FIG. 3, the trajectory control module 306 is configured to unilaterally communicate with the control circuit 310.

Also coupled to the power amplifier 312 of the servo amplifier 304 are galvanometers 314 and 316. The galvanometers 314, 316 operate by converting electrical energy from the power amplifier 312 into mechanical energy such controlling a shaft of a motor. When a current flows in a magnetic field of the galvanometers 314, 316 it experiences a magnetic torque. If it is free to rotate under a controlling torque, it accelerates proportional to the current flowing through it. In an embodiment, it rotates through an angle controlled by the amplifier and determined by a trajectory engine position request. The acceleration of the motor is provided by torque, where the torque is proportional to the current that is applied. In one or more embodiments of the invention, the torque request signal is provided in the form of a voltage. The power the galvanometers 314, 316 receive from the power amplifier 312 can be used to control the projection of the laser at a particular refresh rate. As shown in FIG. 3, the power amplifier 312 is configured to operate at a particular power level. As a result, the galvanometers 314, 316 are controlled to provide the projection at a fixed rate.

Figure 4:
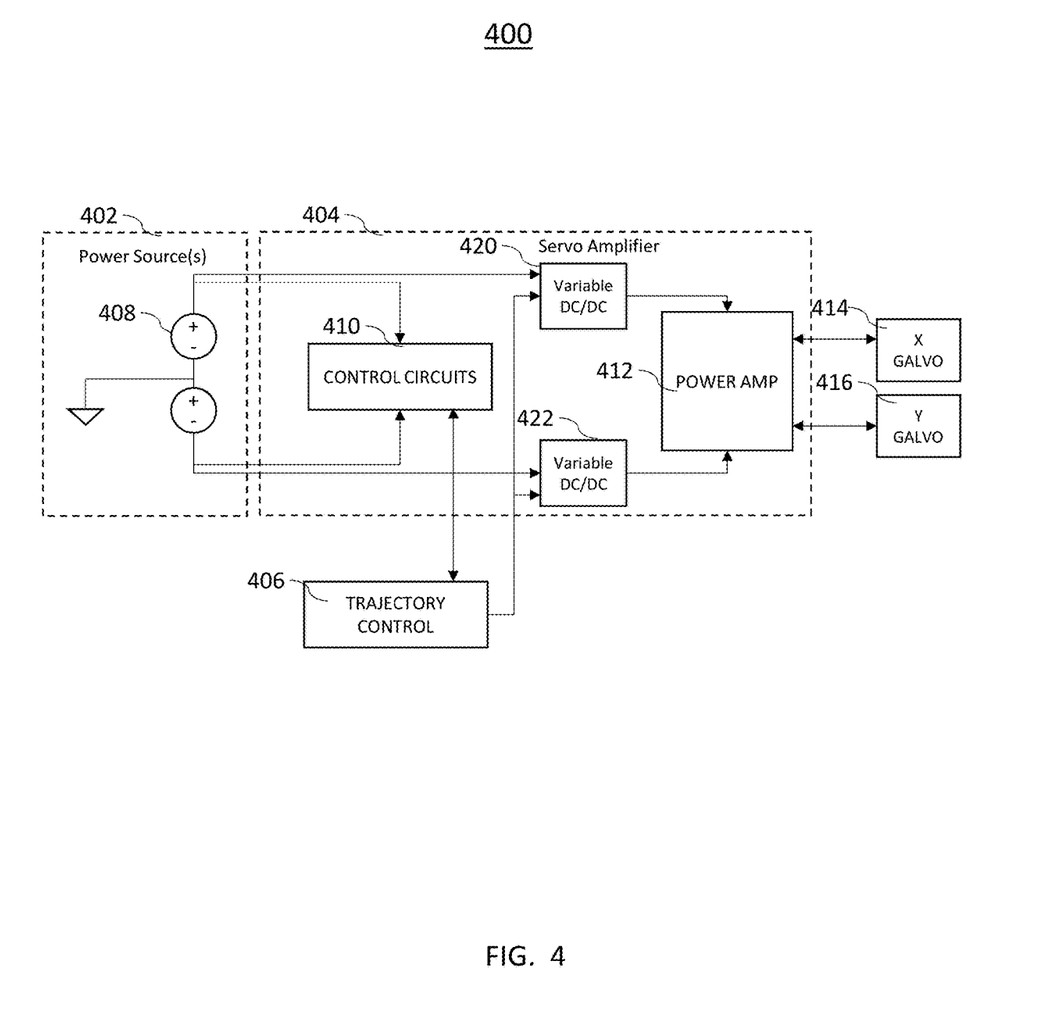
FIG. 4 depicts a system for performing a trajectory optimization in accordance with one or more embodiments.

As shown in FIG. 4, a system 400 for performing trajectory optimization in accordance with one or more embodiments of the invention is provided. Similar to the system 300 shown in FIG. 3, the system 400 includes power sources 402, a servo amplifier 404, and a trajectory control module 406. The trajectory control module 406 can be coupled to the control circuits 410 and is configured for bi-directional communication. The trajectory control module 406 can be configured with CAD data. In another embodiment, the trajectory control module 406 can obtain the trajectory based on scanning the surface of an object. The trajectory control module 406 can also be configured to provide minimize system's power consumption while preserving laser projection quality. The quality of the laser projection can include brightness characteristics and flicker-free characteristics of the projection which can be balanced to optimize the power consumption of the device. In one or more embodiments of the invention, the trajectory control module 406 optimizes the angular acceleration and velocity for each particular trajectory to constrain the refresh rate and ensure the flicker fusion threshold is met by performing the calculations provided above.

The trajectory control module 406 is coupled to one or more power converters 420, 422 and can be used to dynamically control the power provided to the power amplifier 412. The power converters 420, 422 are coupled to the power sources 402, and the power converters 420, 422 can include variable DC/DC converter to adapt a first power level to a second power level or different power level. The adapted power level can be provided to the power amplifier 412 which in turn controls the galvanometers 414, 416. The galvanometers 414, 416 can be a part of the beam steering unit which controls the projection of the laser on to a surface. In one or more embodiments of the invention, the power converters 420, 422 can operate to convert the received power from the power sources 408 to a power level such as but not limited to 20V, 15V, 10V, etc.

A first galvanometer 414 and a second galvanometer 416 are coupled to the power amplifier 412. It should be understood that this not intended to limit the scope of the invention but to provide a non-limiting illustration of the laser projection system. The first and second galvanometer 414, 416 can be controlled independently of one or another as needed.

The galvanometers 414, 416 are configured to receive a voltage signal (current signal) from the power amplifier 412 and are used to convert the electrical energy to mechanical energy. The galvanometers 414, 416 are motors that are used to rotate one or more mirrors to project a laser in a predetermined pattern. For example, a first galvanometer 414 controls an x-direction (with reference to a coordinate plane) and a second galvanometer 416 controls a y-direction of the projected laser.

The power amplifier 412 is configured to provide power to other components of the system such as a motor that is attached to a mirror for controlling the projection of a laser on the surface of an object. The power amplifier 412 is configured to operate using the power supplied from the converters 420, 422 and provide sufficient power to the components to ensure the proper operation of the device.

In some embodiments, a current sensor such as that provided by the galvanometers 414, 416 can also be provided to ensure the commanded current and the measured current are the same or within a tolerable threshold. In the event it is not, an alarm can be provided to indicate such a condition exists. In one or more embodiments, the alarm can include the expected current value (commanded value), the measured value, or a combination thereof.

The system 400 includes a variable DC/DC converter that is coupled to the power source 402 and is configured to convert power that is delivered at a first power level to a different power level. The converter is also coupled to the trajectory control module 406 which is configured to control the converter.

By operating the power amplifier 412 at a reduced power level, the system 400 will consume less power which can increase the duration of an operational state of the device in the event the power source 402 is limited such as a battery. In one or more embodiments of the invention, the laser projection system 400 can operate in a normal mode. In other embodiments, the system can operate in a low-power mode, a power savings mode, or a battery operated mode.

The trajectory control module 406 is configured to bi-directionally communicate with the control circuits 410. The trajectory control module 406 is configured with various types of data including path information or pattern information, power level information, distance information, refresh rate information, area, and other information that is used to project the laser onto a surface. In one or more embodiments, the trajectory control module 506 may also operate unidirectionally in an open loop mode given some operating characteristics of the galvanometers 414, 416 and mirror loads.

Figure 5:
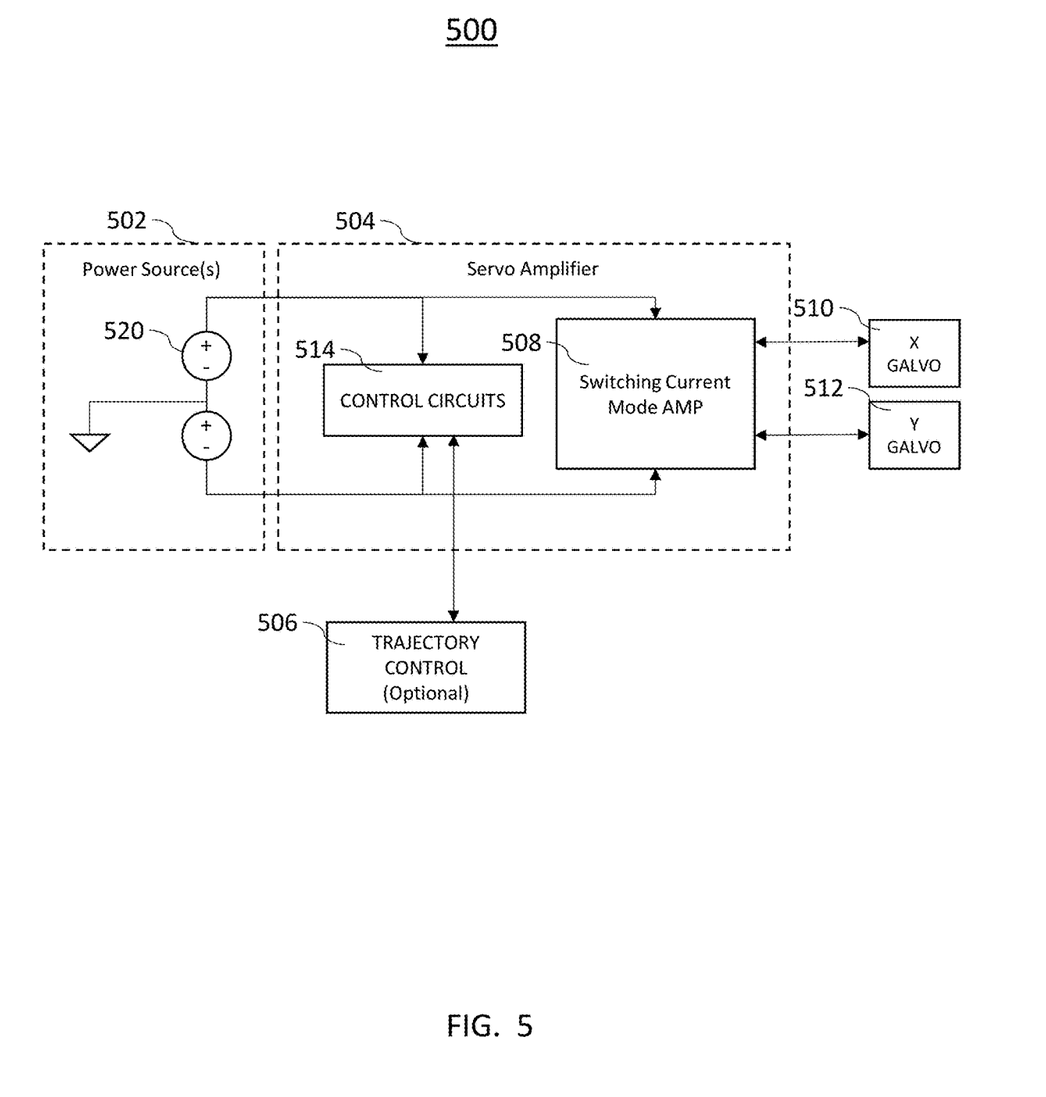
FIG. 5 depicts a different system for performing trajectory optimization in accordance with one or more embodiments.

FIG. 5 depicts a system 500 that includes a switching current mode power amplifier in accordance with one or more embodiments. Similar to FIG. 3, the system 500 includes a power source 502 and a servo amplifier 504. In addition, the trajectory control module 506 is included and can be optional in various embodiments of the invention. The trajectory control module 506 is coupled to the control circuits 514. The servo amplifier 504 includes a switching current mode power amplifier 508 (hereinafter referred to as "amplifier 508) and is coupled to one or more galvanometers 510, 512.

Traditionally, motion-based systems operate based on the transconductance (current mode) where torque is proportional to current and not necessarily voltage. The techniques described herein can implement an amplifier 508 as shown. The feedback from the galvanometers can be provided to the amplifier 508 and used to control the operation of the galvanometers. That is, the duty cycle of the amplifier 508 can be modified based on the feedback to increase or control the rate of the laser projection. The switching of the amplifier 508 can be operated in a fashion to control the effective voltage that is supplied to galvanometers 510 which may be connected to a motor of the beam steering unit. It should be appreciated that by controlling the switching, the power consumption of the system can be optimized through the controlling the refresh rate and the power of the laser. Switching power topologies can achieve efficiencies of 80% or higher over a wide range of loads. The switching power topologies can provide benefits over linear power supply topologies which are optimized for a single typical load.

Figure 6:
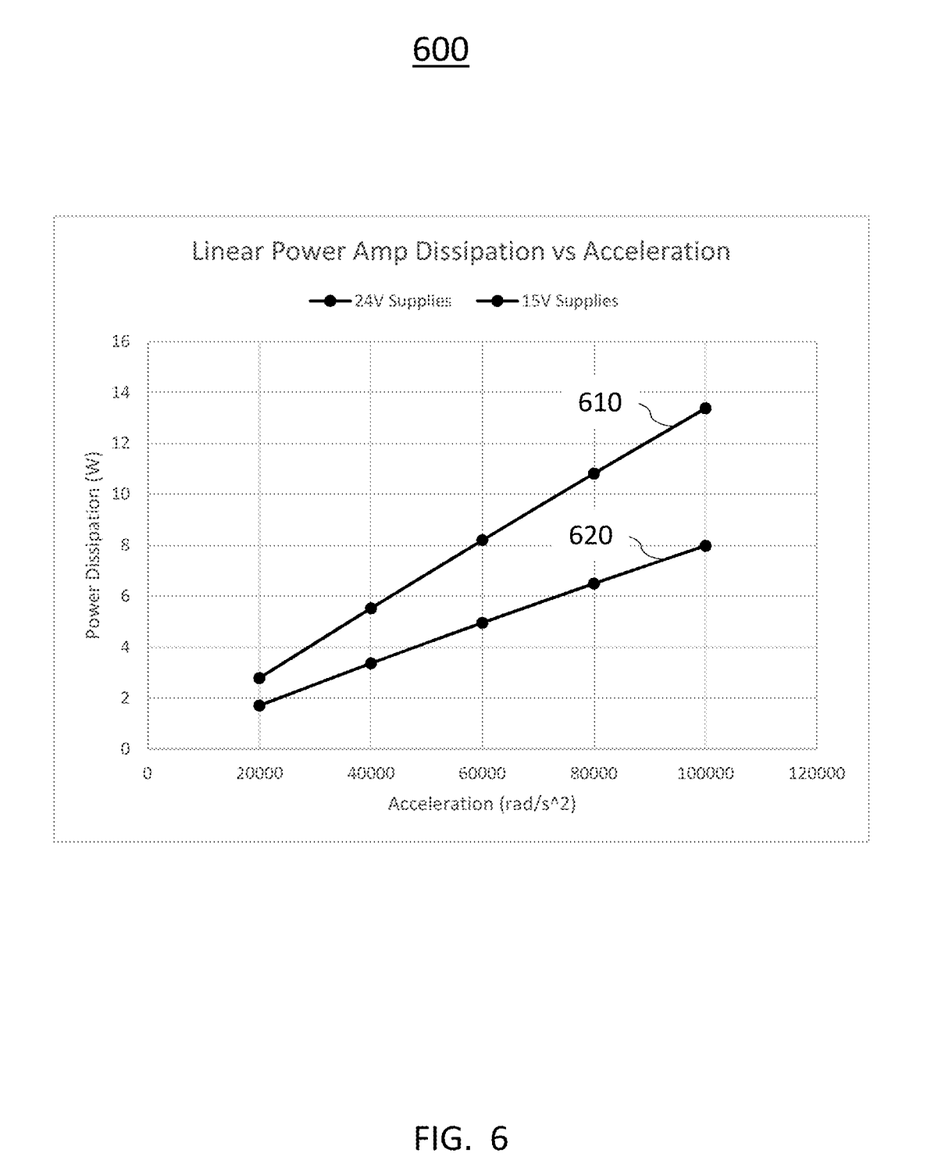
FIG. 6 depicts the relationship between the linear power amplifier dissipation and acceleration in accordance with one or more embodiments.

Now referring to FIG. 6 a graph 600 illustrating the relationship between linear power amplifier dissipation and acceleration is shown. The power dissipation of the linear power amplifier provides the amount of power that is wasted or dissipated as heat and not efficiently used by the system to produce any useful output. As shown in the FIG. 6, the larger the supply voltage and the higher the acceleration, the more power is wasted and dissipated by the power amplifier.

The x-axis of the graph represents the acceleration of the rotation of mirrors and the y-axis represents the power dissipation of the system. The first curve 610 represents the power dissipation of the system operating at a supply voltage of 24V. The second curve 620 represents the power dissipation of the system operating at a supply voltage of 15V. The graph illustrates the relationship between the acceleration using power supplies at various power supply levels and the dissipated power at that voltage. The graph 600 depicts that at a higher power supply voltage, a given acceleration will require more power than that of a lower power supply voltage.

The techniques that are described herein operate the converter to switch modes and operate the laser scanner at a lower power supply level to conserve the limited power source and thusly reduce the amount of power that is wasted by the system. The system can be operated in a lower power mode or based on detected conditions.

Figure 7:
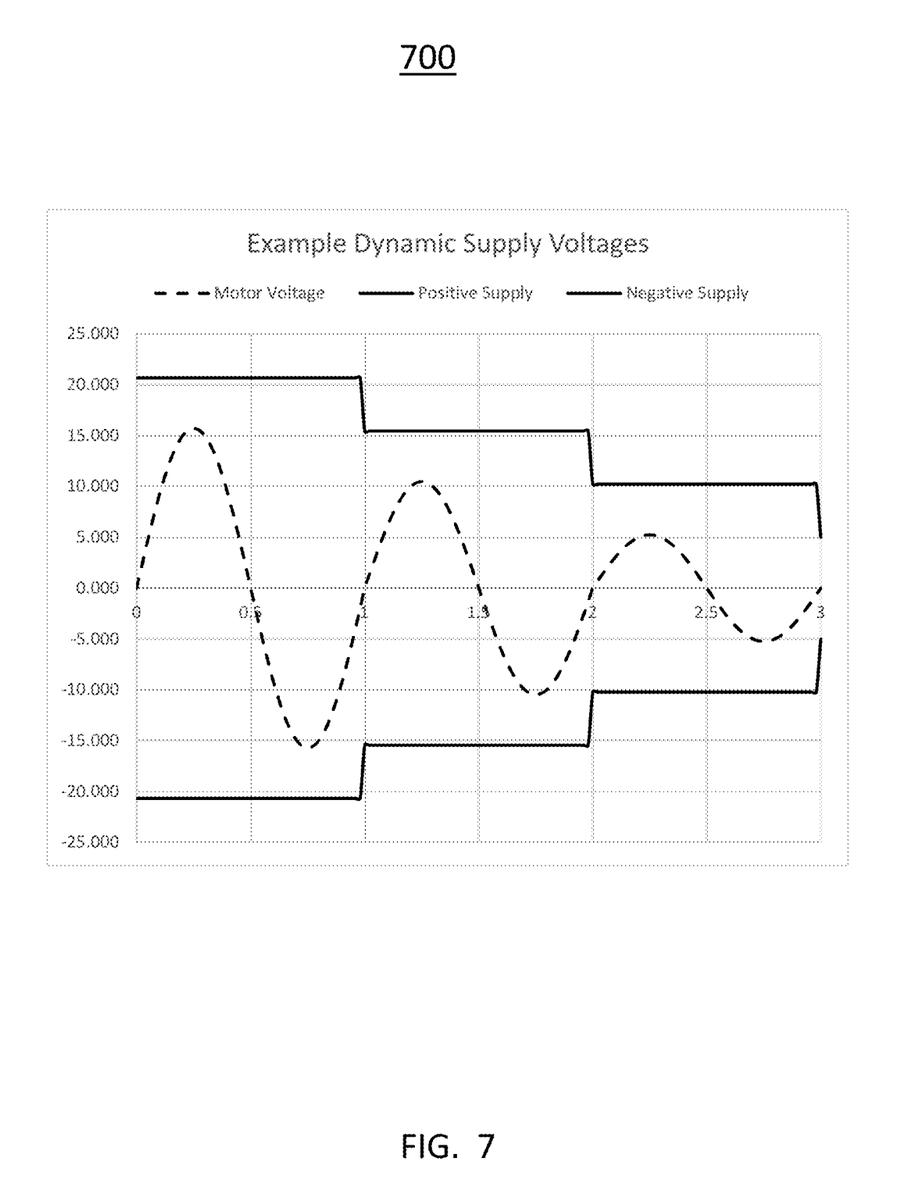
FIG. 7 depicts an example of the supply voltages used in accordance with one or more embodiments.

With reference now to FIG. 7, dynamic supply voltages that can be used in the laser projection system are shown. In one embodiment, the dynamic supply voltages can be supplied at ±20V, 15V, and 10V as selected by the system. The supply voltages can be adapted by the converter to obtain the desired output. The motor voltage is shown FIG. 10 as it changes responsive to the dynamic supply voltage. In one or more embodiments of the invention, the motor is operated to control the rotation and refresh rate of the projection of the laser.

Figure 8:
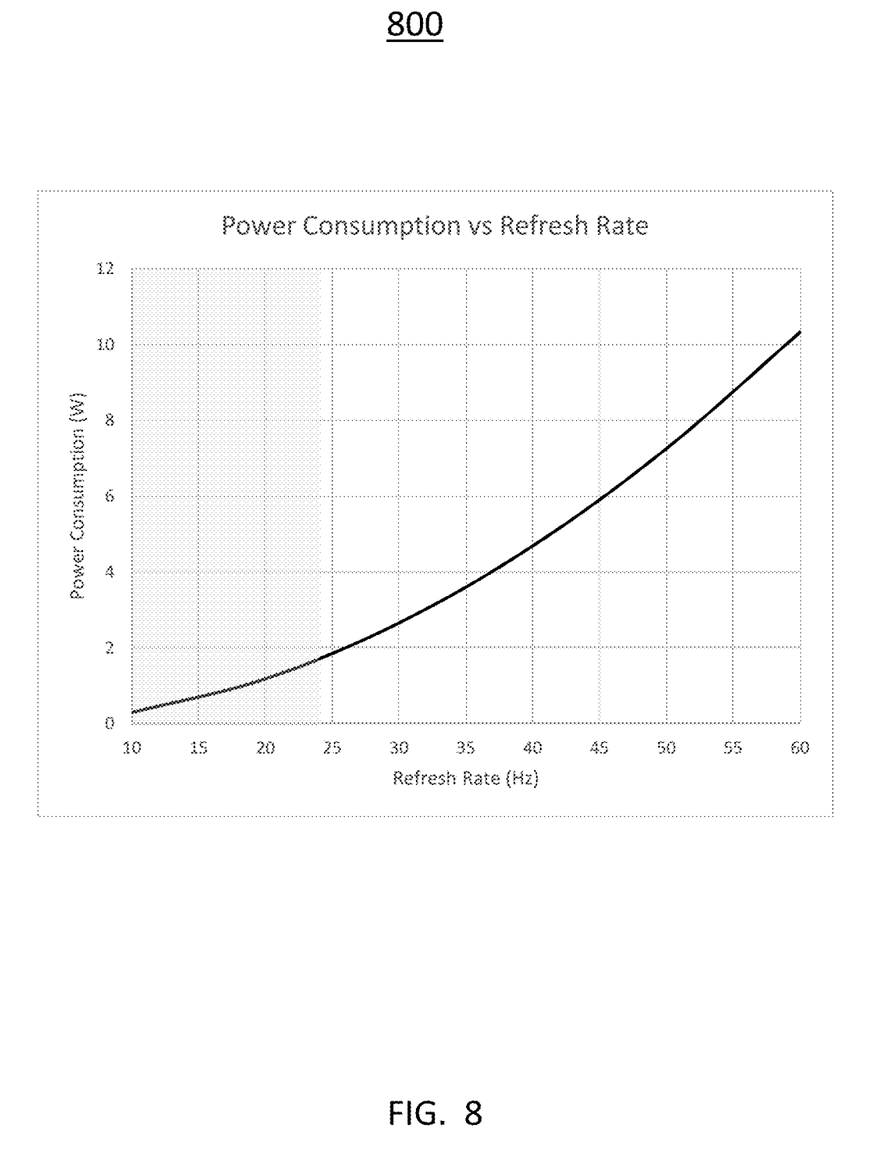
FIG. 8 depicts the relationship between the power consumption and refresh rate for the laser projection system in accordance with one or more embodiments.

FIG. 8 depicts a graph 800 illustrating the relationship between the refresh rate and the power consumed by the laser projection system. The x-axis represents the refresh rate at which the laser projection system operates and the y-axis represents the power consumed by the laser projection system. The curve illustrates that as the refresh rate increases the power consumed by the laser projection system also increases. Also, if the refresh rate is reduced the power consumed by the given laser projection system is reduced.

The techniques that are described herein enable the refresh rate to be optimized and set to a rate that minimizes the power consumed by the laser projection system. By optimizing the refresh rate the power is not unnecessarily wasted and the limited power resources can be conserved.

Figure 9:
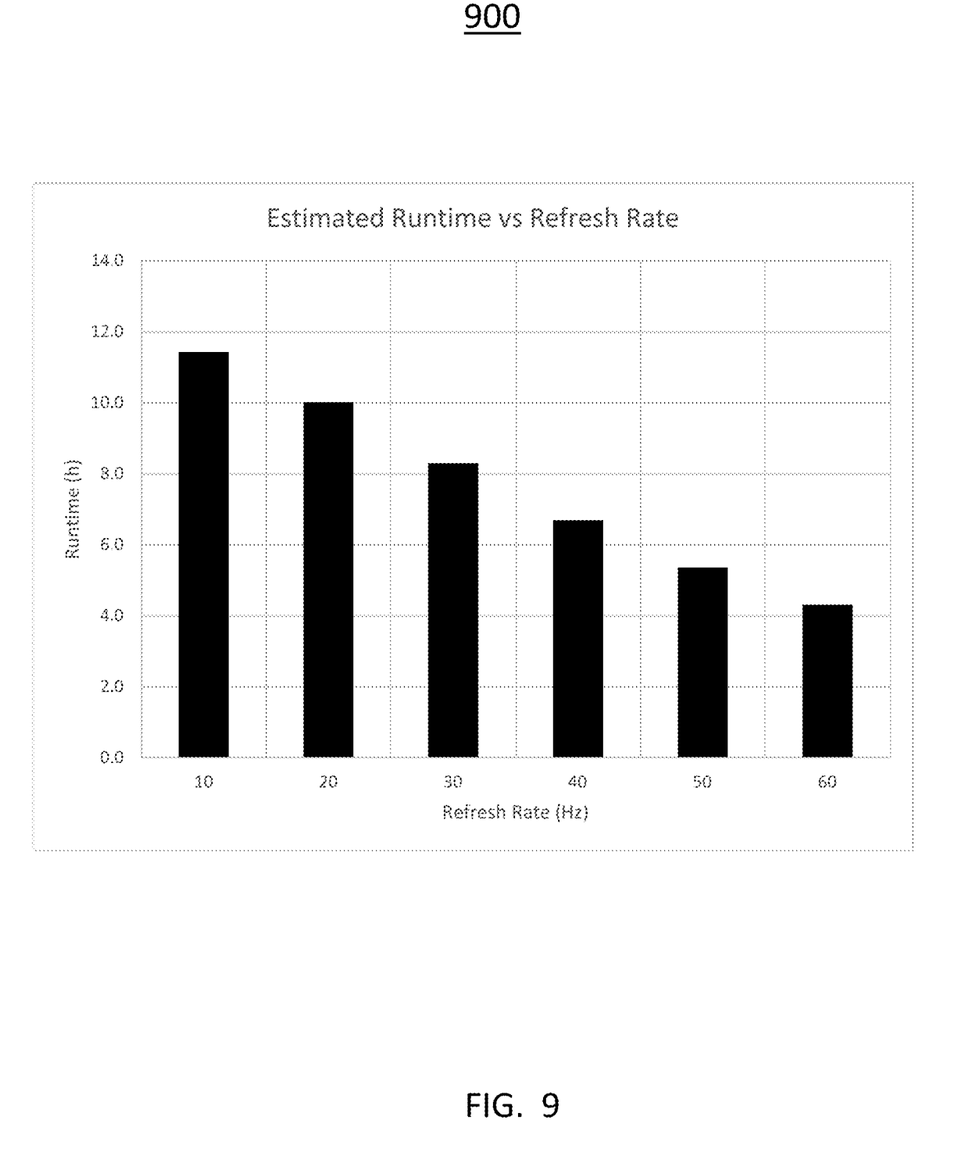
FIG. 9 depicts the relationship between the estimated runtime and the refresh rate for the laser projection system in accordance with one or more embodiments.

FIG. 9 depicts a graph 900 representing the estimated runtime of the laser projection system operating at a given power level against the refresh rate. The x-axis represents the refresh rate for the laser projection system and the y-axis represents the runtime in hours for the laser projection system operating at a particular refresh rate. In this example graph 800, the refresh rate significantly affects power consumption. The techniques described herein can provide substantial energy savings for battery-powered devices for a single charge. For example, if the refresh rate is increased to 60 Hz the runtime is reduced to only 4 hours. For the same laser projection system, if the refresh rate for the projection is at 10 Hz the runtime is approximately 11 hours for the laser projection system. Lower the refresh rate provides substantial power savings for the laser projection system.

Figure 10:
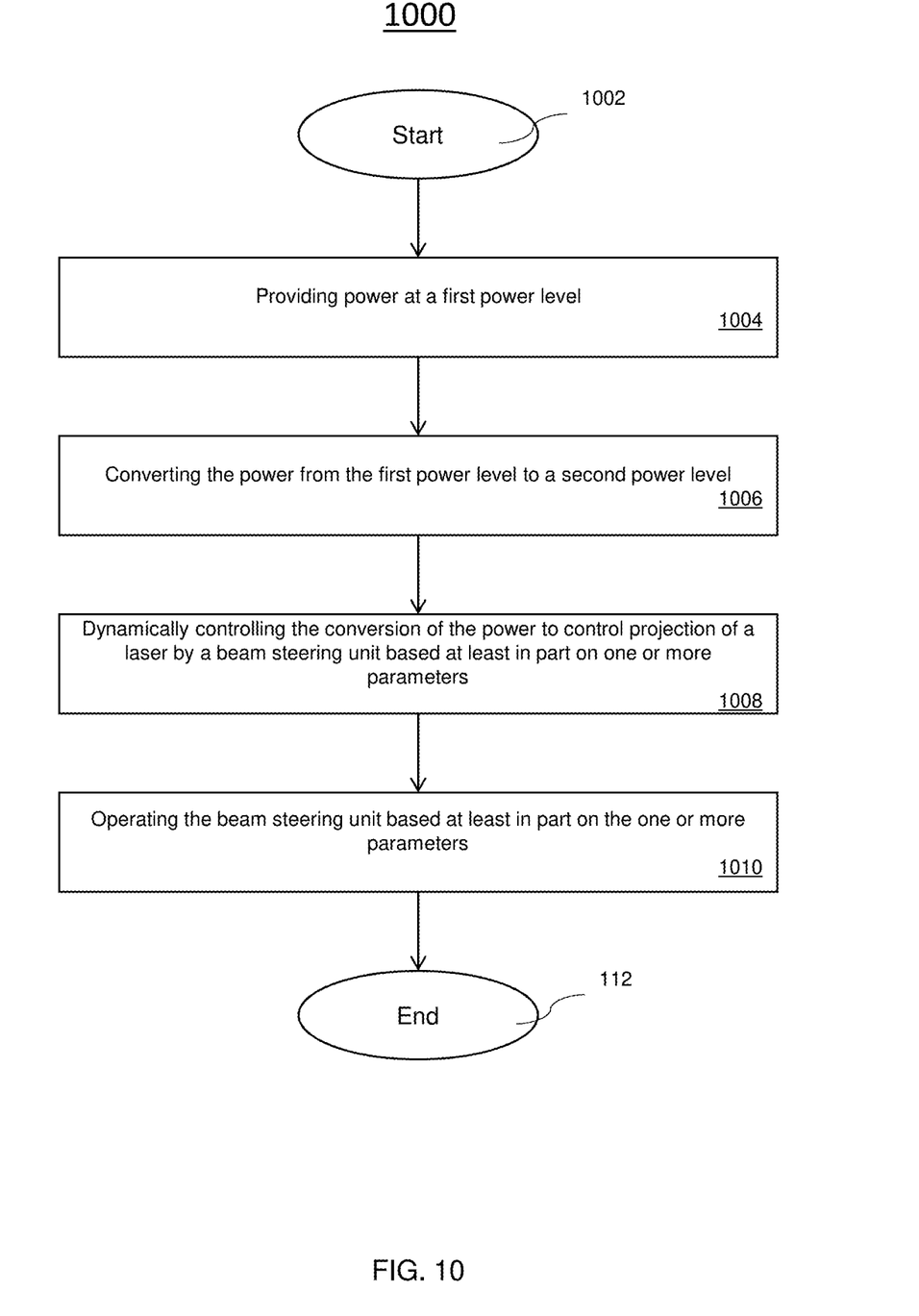
FIG. 10 depicts a flowchart of a method for performing laser trajectory optimization in accordance with one or more embodiments.

Now referring to FIG. 10, a method for 1000 is shown. The method 1000 begins at block 1002 and proceeds to block 1004 which power at a first power level. The power can be provided by a power source including a DC power source such as a battery or an AC power source such as that provided from a wall outlet. In one or more embodiments of the invention, one or more control circuits of the laser projection system can detect whether the laser projection system is operating on battery power or AC power. Responsive to the detection, the laser projection system can be operated in a power saving mode based on the detection. For example, if battery power is detected, the laser projection system can be operated in a power saving mode and if AC power is detected the laser projection system can be operated in a normal or default mode.

The method 1000 at block 1006 converts the power from the first power level to a second power level. The power received from the power source is received at a converter and the power level is adapted to another level to provide the adapted power to the power amplifier. In another embodiment, if a current switching amplifier is used, the duty cycle of the switching amplifier can be controlled to obtain the desired output to control the galvanometers and the projection of the laser.

Block 1008 dynamically controls the conversion of the power to control the projection of a laser by a beam steering unit based at least on one or more parameters. The power level can be adapted to multiple power levels to control the beam steering unit based on a variety of factors. For example, the power levels can be lower if lighting conditions favor lower light which can be detected by a sensor that is coupled to the laser projection system. In another example, a low power mode can be selected by the user. In a different example, if the power source is detected to be a power source such as a DC power supply such as a battery. It should be understood that other factors can be used to adapt the power level to an appropriate level. In one or more embodiments of the invention, the trajectory control module is configured to calculate the optimal refresh rate and provides signals to control the power converter to control the power provided to the galvanometer.

Block 1010 operates the beam steering unit based at least in part on the one or more parameters. In one or more embodiments of the invention, the beam steering unit provides the laser projection at a specified power and the pattern is repeated at a configurable refresh rate. The power and refresh rate can be selected to optimize the projection quality and the power consumed by the projection system. The method ends at block 1012. It should be understood that different steps and/or a sequence of steps can be used and is not limited by those steps that are shown in FIG. 10.

It should be appreciated that while embodiments herein refer to the systems 300, 400, 500 as being used in connection with a laser projection system, this is for example purposes and the claims should not be so limited. In other embodiments, the servo-amplifiers and control systems may be used in any application that uses a galvo.

The technical effects and benefits include operating the galvanometer-based system in a more efficient manner by conserving the limited energy resources.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A laser projection device configured to perform trajectory optimization, the device comprising:
   a power source configured to supply power to a power amplifier;
   a laser source operably coupled to the power source and configured to emit a laser beam;
   a trajectory control module configured to calculate one or more parameters for a projection trajectory of the laser beam;
   a beam steering unit arranged to receive the laser beam from the laser source and configured to control along the projection trajectory a direction of the laser beam towards the surface of an object;
   wherein the power amplifier is operably coupled to the beam steering unit, wherein the output of the power amplifier is based at least in part on the calculated one or more parameters;
   wherein the one or more parameters comprise a refresh rate for the laser beam based on a flicker-free threshold for a particular wavelength; and
   wherein the beam steering unit comprising a first galvanometer coupled to a mirror and a second galvanometer coupled to a second mirror, the power amplifier controlling an effective voltage to the first galvanometer and second galvanometer, wherein the first galvanometer controls the projection of the laser beam in a first direction and the second galvanometer controls the projection of the laser beam in a second direction.

2. The device of claim 1, wherein the beam steering unit includes a mirror configured to rotate about an axis, wherein the rotation about the axis is driven by a motor coupled to the power amplifier.

3. The device of claim 1, further comprising one or more power converters configured to adapt the first power level to a second power level, wherein the converter is coupled to a power amplifier which controls the first and second galvanometers.

4. The device of claim 3, wherein the trajectory control module converts the one or more parameters into command values and provides the command values to the first galvanometer and the second galvanometer to control the refresh rate of the projection trajectory.

5. The device of claim 1, wherein the power amplifier is a switching current mode power amplifier, wherein the output of the switching current mode power amplifier is determined based on a configurable effective duty cycle.

6. A method for operating a laser projection device configured to perform trajectory optimization, the method comprising:
 device;
 supplying power from a power source to a power amplifier of the laser projection emitting a laser beam towards a surface of an object with a laser source;
 calculating with a trajectory control module one or more parameters for a projection trajectory of the laser beam;
 controlling the projection of the laser beam along the projection trajectory with a beam steering unit based at least in part on the calculated one or more parameters, the beam steering unit having at least one galvanometer with a mirror coupled thereto;
 wherein calculating the one or more parameters comprises calculating a refresh rate for the laser beam based on a flicker-free threshold for a particular wavelength; and
 switching a switching current mode power amplifier, wherein the output of the switching current mode power amplifier is determined based on a configurable effective duty cycle to control an effective voltage to the at least one galvanometer.

7. The method of claim 6, wherein controlling the projection of the laser beam comprises controlling a first galvanometer coupled to a mirror and a second galvanometer coupled to a second mirror, wherein the first galvanometer controls the projection of the laser beam in a first direction and the second galvanometer controls the projection of the laser beam in a second direction.

8. The method of claim 6, further comprising adapting a first power level from the supplied power to a second power level.

9. The method of claim 8, further comprising converting, by a trajectory control module the one or more parameters into command values; and
 providing the command values to the first galvanometer and the second galvanometer to control a refresh rate of the projection trajectory.

10. A system for performing trajectory optimization, the system comprising:
 a power source configured to provide power at a first power level;
 a servo amplifier configured to adapt the first power level to a second power level, wherein the servo amplifier is coupled to the power source;
 a trajectory control module is coupled to the servo amplifier, wherein the trajectory control module is configured to control to adapt the first power level to the second power level, wherein the trajectory control module is configured to control projection of a laser by a beam steering unit according to one or more parameters;
 the beam steering unit configured to receive power from the servo amplifier, wherein the beam steering unit includes at least one galvanometer coupled to a minor, the minor being configured to rotate about an axis, wherein the rotation about the axis is driven by a motor, wherein the servo amplifier is configured to control an effective voltage to the at least one galvanometer; and
 wherein the one or more parameters comprise at least one of a refresh rate for the projection of the laser and a power used for the projection of the laser, wherein the refresh rate is calculated to be configured above a threshold refresh rate to provide a flicker-free projection.

11. The system of claim 10, wherein the servo amplifier comprises one or more variable power converters to adapt the first power level to the second power level, wherein the power converters are coupled to and controlled by the trajectory control module.

12. The system of claim 10, wherein the servo amplifier comprises a switching current mode power amplifier, wherein an output of the switching current mode power amplifier is determined based on a configurable effective duty cycle.

* * * * *